(12) United States Patent  
Nagae et al.

(10) Patent No.: US 10,759,423 B2  
(45) Date of Patent: Sep. 1, 2020

(54) LANE DEPARTURE PREVENTING DEVICE

(71) Applicant: TOYOTA JIDOSHA KABUSHIKI KAISHA, Toyota-shi, Aichi-ken (JP)

(72) Inventors: Akira Nagae, Susono (JP); Ryo Inomata, Kanagawa-ken (JP); Hironori Ito, Susono (JP); Masayuki Ikeda, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 257 days.

(21) Appl. No.: 15/787,015

(22) Filed: Oct. 18, 2017

(65) Prior Publication Data

US 2018/0111614 A1  Apr. 26, 2018

(30) Foreign Application Priority Data

Oct. 25, 2016 (JP) .................... 2016-208547

(51) Int. Cl.  
*B60W 30/12* (2020.01)  
*B62D 15/02* (2006.01)  
(Continued)

(52) U.S. Cl.  
CPC ........... *B60W 30/12* (2013.01); *B60T 8/1755* (2013.01); *B60T 8/17557* (2013.01);  
(Continued)

(58) Field of Classification Search  
CPC ............... B60W 30/12; B60W 40/114; B60W 2520/105; B60W 2540/18;  
(Continued)

(56) References Cited

U.S. PATENT DOCUMENTS

| 6,708,098 B2 * | 3/2004 | Matsumoto ......... B60T 8/17557 180/204 |
| 7,925,416 B2 * | 4/2011 | Perisho, Jr. ........... B60W 10/04 701/96 |

(Continued)

FOREIGN PATENT DOCUMENTS

| JP | 2006-182308 A | 7/2006 |
| JP | 2006178715 A | 7/2006 |
| WO | 2009/115884 A1 | 9/2009 |

*Primary Examiner* — Bao Long T Nguyen  
*Assistant Examiner* — Mohammad Mazharul Islam  
(74) *Attorney, Agent, or Firm* — Sughrue Mion, PLLC

(57) ABSTRACT

A lane departure preventing device includes at least one electronic control unit. The at least one electronic control unit is configured to: when there is a likelihood that a vehicle will depart from a traveling lane, calculate a prevention yaw moment, and control a brake actuator such that the prevention yaw moment is applied to the vehicle; acquire a lateral acceleration; determine whether the lateral acceleration is greater than an ideal value by a predetermined value; control the brake actuator such that the braking force matches a target braking force required to apply the prevention yaw moment to the vehicle, when the lateral acceleration is not greater than the ideal value by the predetermined value; and control the brake actuator such that the braking force is less than the target braking force, when the lateral acceleration is greater than the ideal value by the predetermined value.

11 Claims, 6 Drawing Sheets

(51) Int. Cl.
*B60T 8/1755* (2006.01)
*B60W 40/114* (2012.01)
*B62D 6/00* (2006.01)

(52) U.S. Cl.
CPC .......... *B60W 40/114* (2013.01); *B62D 6/003* (2013.01); *B62D 15/025* (2013.01); *B62D 15/029* (2013.01); *B60R 2300/804* (2013.01); *B60T 2201/083* (2013.01); *B60W 2520/105* (2013.01); *B60W 2520/125* (2013.01); *B60W 2520/14* (2013.01); *B60W 2540/18* (2013.01)

(58) Field of Classification Search
CPC ......... B60W 2520/125; B60W 2520/14; B60T 8/17557; B60T 8/1755; B60T 2201/083; B62D 15/029; B62D 15/025; B62D 6/003; B60R 2300/804
See application file for complete search history.

(56) References Cited

U.S. PATENT DOCUMENTS

| | | | |
|---|---|---|---|
| 8,364,370 B2 * | 1/2013 | Yonezawa | B60T 8/17557 340/435 |
| 9,296,374 B2 * | 3/2016 | Yamakado | B60T 8/17555 |
| 2006/0142922 A1 | 6/2006 | Ozaki et al. | |
| 2011/0022285 A1 * | 1/2011 | Yonezawa | B60T 8/17557 701/70 |
| 2015/0329108 A1 * | 11/2015 | Kodaira | B60W 10/20 701/41 |

* cited by examiner

LANE DEPARTURE PREVENTING DEVICE

INCORPORATION BY REFERENCE

The disclosure of Japanese Patent Application No. 2016-208547 filed on Oct. 25, 2016 including the specification, drawings and abstract is incorporated herein by reference in its entirety.

BACKGROUND

1. Technical Field

The present disclosure relates to a lane departure preventing device.

2. Description of Related Art

As a lane departure preventing device, a lane departure preventing device that applies a prevention yaw moment (that is, a target yaw moment) capable of preventing departure of a vehicle from a traveling lane to the vehicle by controlling braking forces applied to vehicle wheels when there is a likelihood that the vehicle will depart from the traveling lane is known (for example, see Japanese Patent Application Publication No. 2006-182308 (JP 2006-182308 A)).

SUMMARY

Depending on a state of a vehicle to which a prevention yaw moment is applied, it may not be preferable to continue to apply an original prevention yaw moment which has been calculated to prevent departure of a vehicle from a traveling lane. Specifically, when a prevention yaw moment is applied to the vehicle, an acceleration of the vehicle (specifically, a longitudinal acceleration and a lateral acceleration) varies. When the acceleration state of the vehicle does not match motion characteristics of the vehicle, there is a likelihood that a certain abnormality will occur internally or externally in the vehicle. Since the original prevention yaw moment is calculated without considering an abnormality occurring in the vehicle, it is not preferable to continue to apply the original yaw moment when an abnormality occurs in the vehicle. However, in JP 2006-182308 A, the original prevention yaw moment continues to be applied to the vehicle until departure of the vehicle from the traveling lane is avoided. Accordingly, the lane departure preventing device described in JP 2006-182308 A cannot appropriately determine whether the original prevention yaw moment will continue to be applied depending on the vehicle state.

The disclosure provides a lane departure preventing device that can appropriately determine whether a prevention yaw moment will continue to be applied depending on a vehicle state and can apply the prevention yaw moment.

A lane departure preventing device includes at least one electronic control unit. The at least one electronic control unit is configured to when there is a likelihood that a vehicle will depart from a traveling lane in which the vehicle travels, calculate a prevention yaw moment for preventing departure of the vehicle from the traveling lane, and control a brake actuator configured to apply a braking force to a vehicle wheel such that the prevention yaw moment is applied to the vehicle. The at least one electronic control unit is configured to acquire a first lateral acceleration and a longitudinal acceleration generated in the vehicle when the prevention yaw moment is applied. The at least one electronic control unit is configured to determine whether the first lateral acceleration is greater than an ideal value of the first lateral acceleration by a first predetermined value. The ideal value of the first lateral acceleration is estimated, from motion characteristics of the vehicle, to be generated in the vehicle due to application of the prevention yaw moment when the longitudinal acceleration is generated in the vehicle due to application of the prevention yaw moment. The at least one electronic control unit is configured to control the brake actuator such that the braking force matches a target braking force required to apply the prevention yaw moment to the vehicle, when it is determined that the first lateral acceleration is not greater than the ideal value by the first predetermined value, and control the brake actuator such that the braking force is less than the target braking force, when it is determined that the first lateral acceleration is greater than the ideal value by the first predetermined value.

According to this configuration, when the lateral acceleration is greater than the ideal value of the lateral acceleration, which is estimated from the longitudinal acceleration, by the first predetermined value, it is determined that a certain abnormality occurs internally or externally in the vehicle. When the lateral acceleration is greater than the ideal value by the first predetermined value (that is, when an abnormality occurs in the vehicle), it is determined that it is not preferable to continue to apply the original prevention yaw moment which has been calculated to prevent departure of the vehicle from the traveling lane. Accordingly, the braking force applied to the vehicle wheel is decreased instead of continuously applying the original prevention yaw moment. As a result, the lane departure preventing device can appropriately determine whether to continue to apply the prevention yaw moment depending on a vehicle state.

The at least one electronic control unit may be configured to cancel application of the braking force by the brake actuator when it is determined that the first lateral acceleration is greater than the ideal value by the first predetermined value.

According to this configuration, when it is estimated that an abnormality occurs in the vehicle, continuous application of the original prevention yaw moment is appropriately stopped.

The at least one electronic control unit may be configured to determine whether a total value of the first lateral acceleration and a second lateral acceleration is greater than the ideal value by a second predetermined value greater than the first predetermined value, when application of the prevention yaw moment is started in a state in which the second lateral acceleration is generated in the vehicle, and determine whether the first lateral acceleration is greater than the ideal value by the first predetermined value when application of the prevention yaw moment is started in a state in which the second lateral acceleration is not generated in the vehicle. The at least one electronic control unit may be configured to control the brake actuator such that the braking force matches the target braking force when it is determined that the total value of the first lateral acceleration and the second lateral acceleration is not greater than the ideal value by the second predetermined value, and control the brake actuator such that the braking force is less than the target braking force when it is determined that the total value of the first lateral acceleration and the second lateral acceleration is greater than the ideal value by the second predetermined value.

According to this configuration, as will be described later in detail with reference to the accompanying drawings, even when application of the prevention yaw moment is started in a state in which a lateral acceleration is generated in the vehicle, the lane departure preventing device can appropriately determine whether to continue to apply the prevention yaw moment depending on the vehicle state.

The second predetermined value may be greater than the first predetermined value by the second lateral acceleration generated in the vehicle before application of the prevention yaw moment is started According to this configuration, even when application of the prevention yaw moment is started in a state in which a lateral acceleration is generated in the vehicle, the lane departure preventing device can appropriately determine whether to continue to apply the prevention yaw moment depending on the vehicle state.

The at least one electronic control unit may be configured to cancel application of the braking force by the brake actuator when it is determined that the total value of the first lateral acceleration and the second lateral acceleration is greater than the ideal value by the second predetermined value.

According to this configuration, when it is estimated that an abnormality occurs in the vehicle, continuous application of the original prevention yaw moment is appropriately stopped.

The first predetermined value may be calculated based on the longitudinal acceleration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a lane departure preventing device according to embodiments of the disclosure will be described with reference to the accompanying drawings. In the following description, description will be made using a vehicle 1 in which the lane departure preventing device according to the embodiments of the disclosure is mounted.

(1) Configuration of Vehicle 1 According to First Embodiment (1-1)

Figure 1:
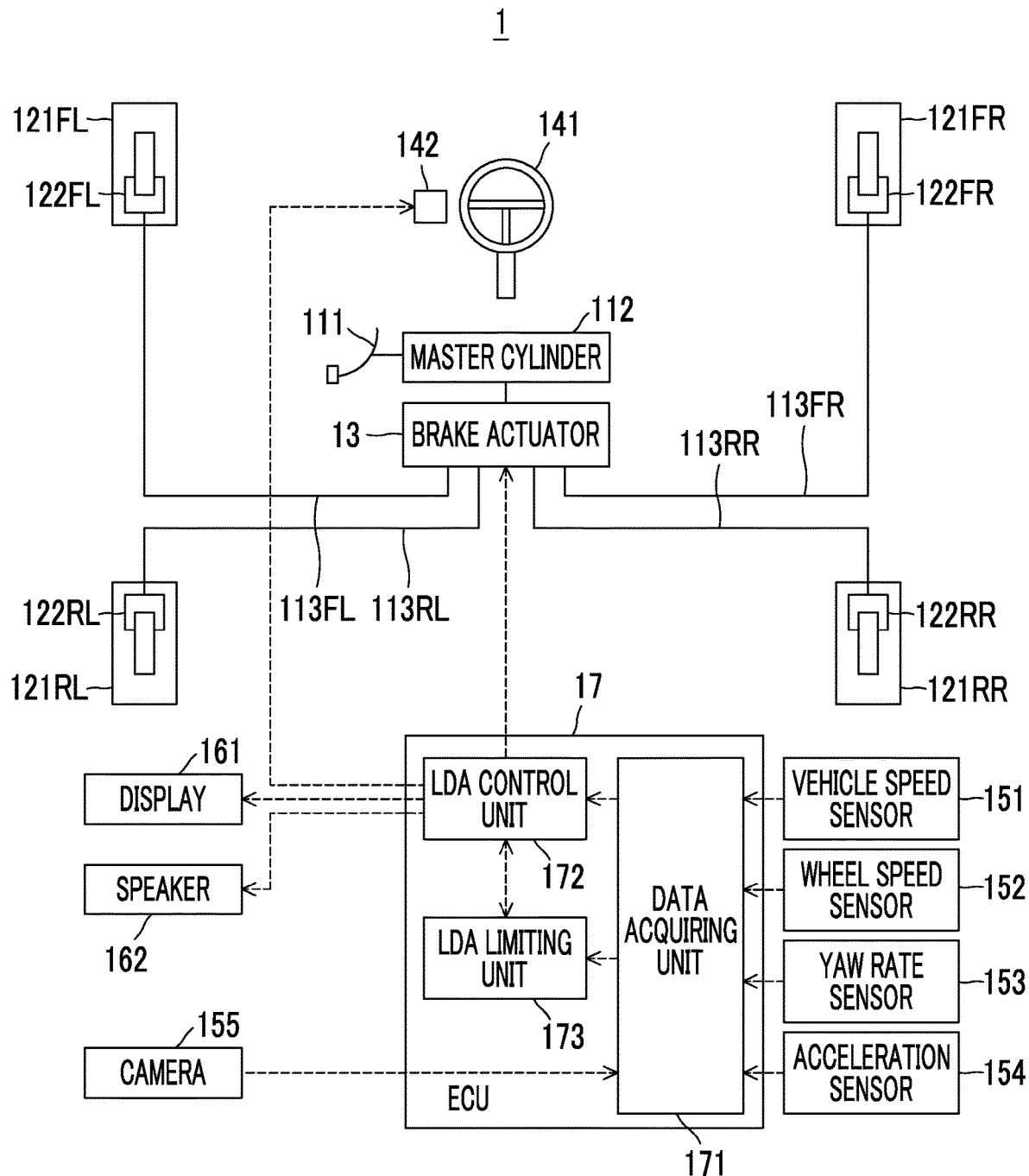
FIG. 1 is a block diagram illustrating a configuration of a vehicle according to an embodiment.

A configuration of a vehicle 1 according to a first embodiment will be described below with reference to the block diagram illustrated in FIG. 1. As illustrated in FIG. 1, the vehicle 1 includes a brake pedal 111, a master cylinder 112, a brake pipe 113FL, a brake pipe 113RL, a brake pipe 113FR, a brake pipe 113RR, a front-left wheel 121FL, a rear-left wheel 121RL, a front-right wheel 121FR, a rear-right wheel 121RR, a wheel cylinder 122FL, a wheel cylinder 122RL, a wheel cylinder 122FR, a wheel cylinder 122RR, a brake actuator 13, a steering wheel 141, a vibration actuator 142, a vehicle speed sensor 151, a wheel speed sensor 152, a yaw rate sensor 153, an acceleration sensor 154, a camera 155, a display 161, a speaker 162, and an electronic control unit (ECU) 17 which is a specific example of a "lane departure preventing device."

The brake pedal 111 is a pedal which is depressed by a driver to brake the vehicle 1. The master cylinder 112 adjusts a pressure of a brake fluid (or an arbitrary fluid) in the master cylinder 112 to a pressure corresponding to an amount of depression of the brake pedal 111. The pressure of the brake fluid in the master cylinder 112 is transmitted to the wheel cylinders 122FL, 122RL, 122FR, and 122RR via the brake pipes 113FL, 113RL, 113FR, and 113RR. Accordingly, braking forces corresponding to the fluid pressures of the brake fluid transmitted to the wheel cylinders 122FL, 122RL, 122FR, and 122RR are applied to the front-left wheel 121FL, the rear-left wheel 121RL, the front-right wheel 121FR, and the rear-right wheel 121RR.

The brake actuator 13 can adjust the pressures of the brake fluid transmitted to the wheel cylinders 122FL, 122RL, 122FR, and 122RR regardless of the amount of depression of the brake pedal 111 under the control of the ECU 17. Accordingly, the brake actuator 13 can adjust the braking forces applied to the front-left wheel 121FL, the rear-left wheel 121RL, the front-right wheel 121FR, and the rear-right wheel 121RR regardless of the amount of depression of the brake pedal 111.

The steering wheel 141 is an operator that is operated by a driver to steer the vehicle 1 (that is, to steer turning wheels). In the first embodiment, the turning wheels are assumed to be the front-left wheel 121FL and the front-right wheel 121FR. The vibration actuator 142 can cause the steering wheel 141 to vibrate under the control of the ECU 17.

The vehicle speed sensor 151 detects a vehicle speed Vv of the vehicle 1. The wheel speed sensor 152 detects wheel speeds Vw of the front-left wheel 121FL, the rear-left wheel 121RL, the front-right wheel 121FR, and the rear-right wheel 121RR. The yaw rate sensor 153 detects a yaw rate γ of the vehicle 1. The acceleration sensor 154 detects an acceleration G (specifically, a longitudinal acceleration Gx and a lateral acceleration Gy) of the vehicle 1. The camera 155 is an imaging device that images an external situation of the front side of the vehicle 1. Detection data indicating the detection results of the vehicle speed sensor 151 to the acceleration sensor 154 and image data indicating an image captured by the camera 155 are output to the ECU 17.

The display 161 can display arbitrary information under the control of the ECU 17. The speaker 162 can output an arbitrary sound under the control of the ECU 17.

The ECU 17 controls the whole operations of the vehicle 1. In the first embodiment, particularly, the ECU 17 performs a lane departure preventing operation for preventing departure of the vehicle 1 from a traveling lane in which the vehicle is traveling. Accordingly, the ECU 17 serves as a controller for realizing so-called lane departure alert (LDA) or lane departure prevention (LDP).

In order to perform the lane departure preventing operation, the ECU 17 includes a data acquiring unit 171, an LDA control unit 172, and an LDA limiting unit 173, as processing blocks which are logically realized or processing circuits which are physically realized in the ECU 17. The operations of the data acquiring unit 171, the LDA control unit 172, and the LDA limiting unit 173 will be described later in detail with reference to FIG. 2 and the like, and outlines thereof will be described below in brief. The data acquiring unit 171 acquires the detection data indicating the detection results of the vehicle speed sensor 151 to the acceleration sensor 154 and the image data indicating an image captured by the camera 155. When there is a likelihood that the vehicle 1 will depart from the traveling lane in which the vehicle is traveling based on the detection data and the image data acquired by the data acquiring unit 171, the LDA control unit 172 controls the brake actuator 13 such that a prevention yaw moment capable of preventing departure of the vehicle 1 from the traveling lane using the braking force is applied to at least one of the front-left wheel 121FL, the rear-left wheel 121RL, the front-right wheel 121FR, and the rear-right wheel 121RR. "Prevention of departure of the vehicle 1 from the traveling lane" in the first embodiment means that an actual departure distance of the vehicle 1 from the traveling lane when a prevention yaw moment is applied is set to be less than a departure distance of the vehicle 1 from the traveling lane which is assumed when the prevention yaw moment is not applied. The LDA limiting unit 173 determines whether to stop application of the prevention yaw moment (that is, whether to stop application of the braking force capable of applying the prevention yaw moment).

(1-2) Details of Lane Departure Preventing Operation

A lane departure preventing operation which is performed by the ECU 17 will be described below with reference to the flowchart illustrated in FIG. 2.

Figure 2:
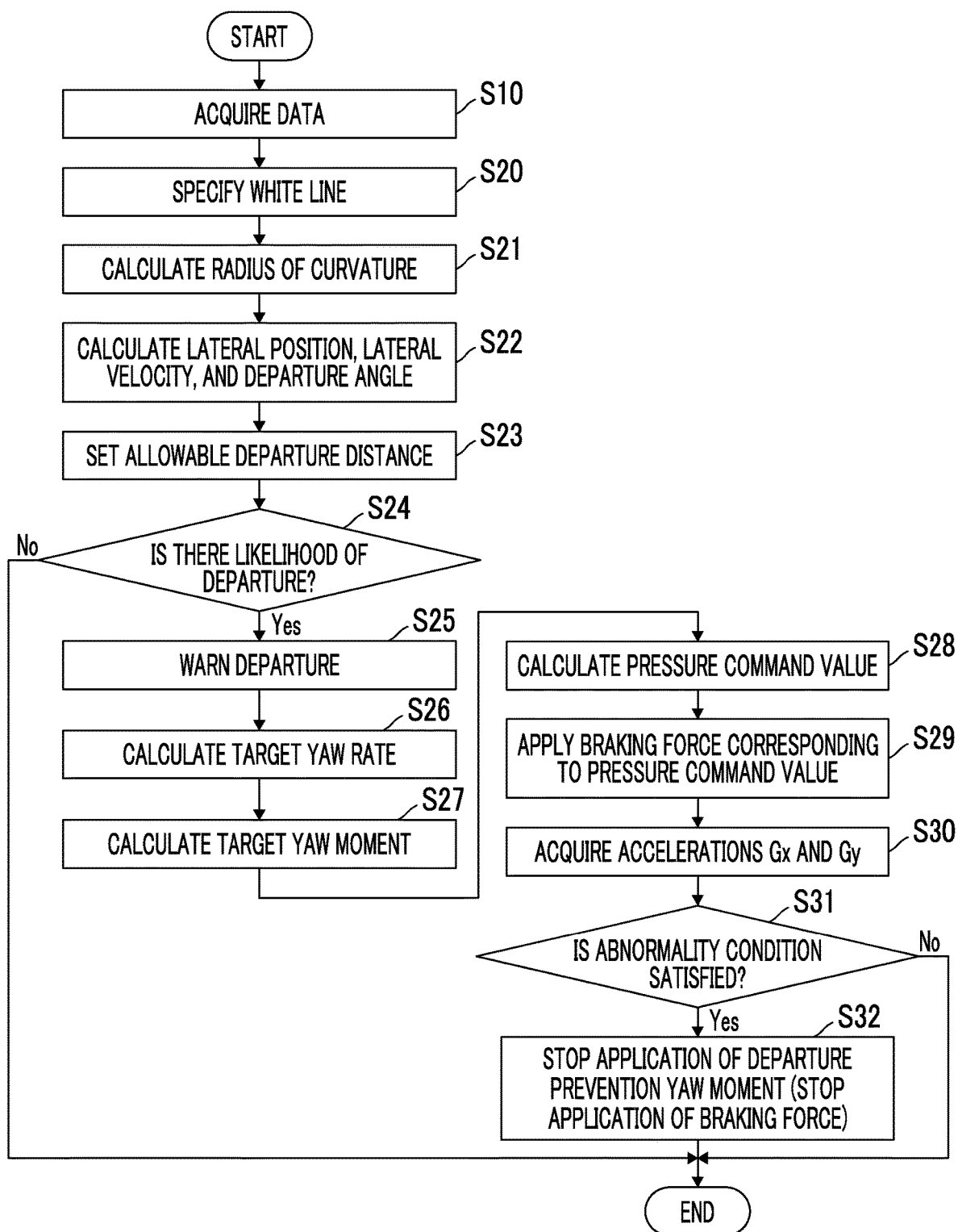
FIG. 2 is a flowchart illustrating a flow of a lane departure preventing operation.

As illustrated in FIG. 2, first, the data acquiring unit 171 acquires the detection data indicating the detection results of the vehicle speed sensor 151 to the acceleration sensor 154 and the image data indicating an image captured by the camera 155 (Step S10).

Thereafter, the LDA control unit 172 specifies a lane edge of the traveling lane (a white line is used as an example of the lane edge in the first embodiment) in which the vehicle 1 is traveling in an image captured by the camera 155 by analyzing the image data acquired in Step S10 (Step S20).

Thereafter, the LDA control unit 172 calculates a radius of curvature R of the traveling lane in which the vehicle 1 is traveling based on the white line specified in Step S20 (Step S21). The radius of curvature R of the traveling lane is actually equivalent to a radius of curvature of the white line. Accordingly, the LDA control unit 172 may calculate the radius of curvature of the white line specified in Step S20 and treat the calculated radius of curvature as the radius of curvature R of the traveling lane. Here, the LDA control unit 172 may calculate the radius of curvature R of the traveling lane in which the vehicle 1 is traveling using position information of the vehicle 1 specified using a global positioning system (GPS) and map information used for a navigation operation.

The LDA control unit 172 calculates a current lateral position X of the vehicle 1 based on the white line specified in Step S20 (Step S22). The "lateral position X" in the first embodiment indicates a distance from the center of the traveling lane to the vehicle 1 in a lane width direction perpendicular to an extending direction of the traveling lane (a lane extending direction) (typically a distance to the center of the vehicle 1). In this case, it is preferable that one of a direction to the right side from the center of the traveling lane and a direction to the left side be set as a positive direction and the other of the direction to the right side from the center of the traveling lane and the direction to the left side be set as a negative direction. The same is true of a lateral velocity V1 which will be described later, a yaw moment such as the above-mentioned prevention yaw moment, the above-mentioned lateral acceleration Gy, and the above-mentioned yaw rate γ, and the like.

The LDA control unit 172 additionally calculates a departure angle θ of the vehicle 1 based on the white line specified in Step S20 (Step S22). The "departure angle θ" in the first embodiment indicates an angle which is formed by the traveling lane and a front-rear direction axis of the vehicle 1 (that is, an angle formed by the white line and the front-rear direction axis of the vehicle 1).

The LDA control unit 172 calculates the lateral velocity V1 of the vehicle 1 based on time-series data of the lateral position X of the vehicle 1 calculated from the white line (Step S22). Here, the LDA control unit 172 may calculate the lateral velocity V1 of the vehicle 1 based on at least one of the detection result of the vehicle speed sensor 151, the calculated departure angle θ, and the detection result of the acceleration sensor 154. The "lateral velocity V1" in the first embodiment indicates the speed of the vehicle 1 in the lane width direction.

The LDA control unit 172 sets an allowable departure distance D (Step S23). The allowable departure distance D indicates a maximum value of a departure distance of the vehicle 1 from the traveling lane (that is, a departure distance of the vehicle 1 from the white line) when the vehicle 1 departs from the traveling lane. Accordingly, the lane departure preventing operation is an operation of applying a prevention yaw moment to the vehicle 1 such that the departure distance of the vehicle 1 from the traveling lane is less than the allowable departure distance D.

The LDA control unit 172 may set the allowable departure distance D from the viewpoint of satisfying requirements of the law (for example, requirements of a new car assessment programme (NCAP)). In this case, the allowable departure distance D set from the viewpoint of satisfying the requirements of the law may be used as a default allowable departure distance D.

Thereafter, the LDA control unit 172 determines whether there is a likelihood that the vehicle 1 will depart from the traveling lane in which the vehicle is traveling (Step S24). Specifically, the LDA control unit 172 calculates a future lateral position Xf. For example, the LDA control unit 172 calculates the lateral position X at a time point at which the vehicle 1 travels a distance corresponding to a front gaze distance from the current position as the future lateral position Xf. The future lateral position Xf can be calculated by adding or subtracting a value, which is obtained by multiplying a time Δt required for the vehicle 1 to travel the front gaze distance by the lateral velocity V1, to or from the current lateral position X. Thereafter, the LDA control unit 172 determines whether the absolute value of the future lateral position Xf is equal to or greater than a departure threshold value. When it is assumed that the vehicle 1 travels in a direction parallel to the lane extending direction, the departure threshold value is, for example, a value (specifically (width of traveling lane−width of vehicle 1)/2)) which is determined based on the width of the traveling lane and the width of the vehicle 1. In this case, a situation in which the absolute value of the future lateral position Xf is equal to the departure threshold value corresponds to a situation in which a side surface of the vehicle 1 along the lane width direction (for example, a side surface distant from the center of the traveling lane) is located on the white line. A situation in which the absolute value of the future lateral position Xf is greater than the departure threshold value is a situation in which a side surface of the vehicle 1 along the lane width direction (for example, a side surface distant from the center of the traveling lane) is located outside the white line. Accordingly, when the absolute value of the future lateral position Xf is not equal to or greater than the departure threshold value, the LDA control unit 172 determines that there is not likelihood that the vehicle 1 will depart from the traveling lane in which the vehicle is traveling. On the other hand, when the absolute value of the future lateral position Xf is equal to or greater than the departure threshold value, the LDA control unit 172 determines that there is a likelihood that the vehicle 1 will depart from the traveling lane in which the vehicle is traveling. Here, since the vehicle 1 may actually travel in a direction which is not parallel to the lane extending direction, an arbitrary value other than the above-mentioned threshold value may be used as the departure threshold value.

The above-mentioned operation is merely an example of an operation of determining whether there is a likelihood that the vehicle 1 will depart from the traveling lane in which the vehicle is traveling. Accordingly, the LDA control unit 172 may determine whether there is a likelihood that the vehicle 1 will depart from the traveling lane in which the vehicle is traveling using an arbitrary criterion. An example of the situation in which "there is a likelihood that the vehicle 1 will depart from the traveling lane" is a situation in which the vehicle 1 will go over or come in contact with the white line in the near future (for example, at a time point at which the vehicle travels a distance corresponding to the front gaze distance).

When it is determined in Step S24 that there is no likelihood that the vehicle 1 will depart the traveling lane (NO in Step S24), the lane departure preventing operation illustrated in FIG. 2 ends. Accordingly, the operations (Steps S25 to S32) which are performed when it is determined that there is a likelihood that the vehicle 1 will depart from the traveling lane are not performed. That is, the LDA control unit 172 controls the brake actuator 13 such that the prevention yaw moment is not applied to the vehicle 1 (that is, such that a braking force capable of applying the prevention yaw moment to the vehicle 1 is not applied). The LDA control unit 172 does not alarm a driver about that there is a likelihood that the vehicle 1 will depart from the traveling lane.

When the lane departure preventing operation illustrated in FIG. 2 ends because it is determined that there is no likelihood that the vehicle 1 will depart from the traveling lane, the ECU 17 starts the lane departure preventing operation illustrated in FIG. 2 again after a first predetermined period of time (for example, several milliseconds to several tens of milliseconds) elapses. That is, the lane departure preventing operation illustrated in FIG. 2 is repeatedly performed at intervals corresponding to the first predetermined period of time. The first predetermined period of time is a period corresponding to a default period in which the lane departure preventing operation illustrated in FIG. 2 is repeatedly performed.

On the other hand, when it is determined in Step S24 that there is a likelihood that the vehicle 1 will depart from the traveling lane (YES in Step S24), the LDA control unit 172 warns a driver about that there is a likelihood that the vehicle 1 will depart from the traveling lane (Step S25). For example, the LDA control unit 172 may control the display 161 such that an image indicating that there is a likelihood that the vehicle 1 will depart from the traveling lane is displayed. Alternatively, for example, in addition to or instead of controlling of the display 161 as described above, the LDA control unit 172 may control the vibration actuator 142 such that the driver is notified that there is a likelihood that the vehicle 1 will depart from the traveling lane by vibration of the steering wheel 141. Alternatively, in addition to or instead of controlling of at least one of the display 161 and the vibration actuator 142 as described above, the LDA control unit 172 may control the speaker (a so-called buzzer) 162 such that the driver is notified that there is a likelihood that the vehicle 1 will depart from the traveling lane by warning sound.

When it is determined that there is a likelihood that the vehicle 1 will depart from the traveling lane, the LDA control unit 172 additionally controls the brake actuator 13 such that the braking force capable of applying the prevention yaw moment to the vehicle 1 is applied (Steps S26 to S29).

Specifically, when there is likelihood that the vehicle 1 will depart from the traveling lane, there is a high likelihood that the vehicle 1 will travel to be separated away from the center of the traveling lane. Accordingly, when a traveling path of the vehicle 1 is changed from a traveling path in which the vehicle travels to be separated away from the center of the traveling lane to a traveling path in which the vehicle travels toward the center of the traveling lane, departure of the vehicle 1 from the traveling lane is prevented. Accordingly, the LDA control unit 172 calculates a new traveling path in which the vehicle 1 having traveled to be separated away from the center of the traveling lane travels toward the center of the traveling lane based on the detection data, the image data, the specified white line, the calculated radius of curvature R, the calculated lateral position X, the calculated lateral velocity V1, the calculated departure angle θ, and the set allowable departure distance D. At this time, the LDA control unit 172 calculates a new traveling path satisfying the restriction of the allowable departure distance D set in Step S23. The LDA control unit 172 calculates a yaw rate which is estimated to be generated in the vehicle 1 traveling on the calculated new traveling path as a target yaw rate $\gamma_{tgt}$ (Step S26).

Thereafter, the LDA control unit 172 calculates a yaw moment to be applied to the vehicle 1 for generating the target yaw rate $\gamma_{tgt}$ in the vehicle 1 as a target yaw moment $M_{tgt}$ (Step S27). The target yaw moment $M_{tgt}$ is equivalent to the prevention yaw moment.

Thereafter, the LDA control unit 172 calculates a braking force capable of applying the target yaw moment $M_{tgt}$ to the vehicle 1. In this case, the LDA control unit 172 individually calculates the braking forces which are applied to the front-left wheel 121FL, the rear-left wheel 121RL, the front-right wheel 121FR, and the rear-right wheel 121RR. Thereafter, the LDA control unit 172 calculates pressure command values for designating pressures of the brake fluid required for generating the calculated braking forces (Step S28). In this case, the LDA control unit 172 individually calculates the pressure command values for designating the pressures of the brake fluid in the wheel cylinders 122FL, 122RL, 122FR, and 122RR.

For example, when it is determined that there is a likelihood that the vehicle 1 will depart from the traveling lane over the white line located on the right side in the traveling direction of the vehicle 1, the prevention yaw moment capable of deflecting the vehicle 1 to the left side in the traveling direction of the vehicle 1 has only to be applied to the vehicle 1 in order to prevent departure of the vehicle 1 from the traveling lane. In this case, when no braking force is applied to the front-right wheel 121FR and the rear-right wheel 121RR and a braking force is applied to at least one of the front-left wheel 121FL and the rear-left wheel 121RL, or when a relatively small braking force is applied to at least one of the front-right wheel 121FR and the rear-right wheel 121RR and a relatively large braking force is applied to at least one of the front-left wheel 121FL and the rear-left wheel 121RL, a prevention yaw moment capable of deflecting the vehicle 1 to the left side is applied to the vehicle 1. In a case in which it is determined that there is a likelihood that the vehicle 1 will depart from the traveling lane over the white line on the left side in the traveling direction of the vehicle 1, when no braking force is applied to the front-left wheel 121FL and the rear-left wheel 121RL and a braking force is applied to at least one of the front-right wheel 121FR and the rear-right wheel 121RR, or when a relatively small braking force is applied to at least one of the front-left wheel 121FL and the rear-left wheel 121RL and a relatively large braking force is applied to at least one of the front-right wheel 121FR and the rear-right wheel 121RR, a prevention yaw moment capable of deflecting the vehicle 1 to the right side in the traveling direction of the vehicle 1 is applied to the vehicle 1.

Thereafter, the LDA control unit 172 controls the brake actuator 13 based on the pressure command values calculated in Step S28. Accordingly, the braking forces corresponding to the pressure command values are applied to at least one of the front-left wheel 121FL, the rear-left wheel 121RL, the front-right wheel 121FR, and the rear-right wheel 121RR (Step S29). As a result, the prevention yaw moment which is equivalent to the target yaw moment $M_{tgt}$ is applied to the vehicle 1, and thus departure of the vehicle 1 from the traveling lane is prevented.

Thereafter, in a state in which the prevention yaw moment is applied to the vehicle 1, the data acquiring unit 171 acquires the longitudinal acceleration Gx and the lateral acceleration Gy (Step S30). Thereafter, the LDA limiting unit 173 determines whether abnormality conditions which are satisfied when a certain abnormality occurs internally or externally in the vehicle 1 to which the prevention yaw moment is applied are satisfied based on the longitudinal acceleration Gx and the lateral acceleration Gy acquired in Step S30 (Step S31). That is, the LDA limiting unit 173 determines whether the longitudinal acceleration Gx and the lateral acceleration Gy acquired in Step S30 indicates that an abnormality occurs in the vehicle 1.

An example of the abnormality conditions will be described below with reference to FIGS. 3A to 3D.

Figure 3A:
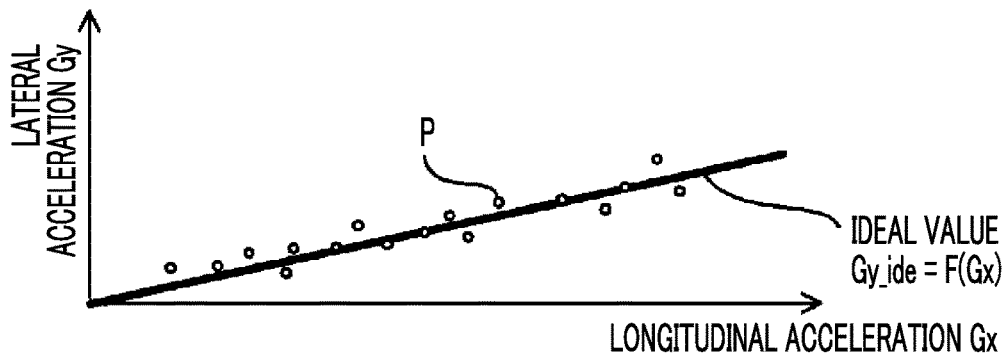
FIG. 3A is a graph illustrating a relationship between a longitudinal acceleration and a lateral acceleration when an abnormality does not occur in a vehicle to which a prevention yaw moment is applied.

First, FIG. 3A is a graph illustrating a relationship between the longitudinal acceleration Gx and the lateral acceleration Gy when the prevention yaw moment is applied to the vehicle 1 in which no abnormality occurs (that is, an ideal relationship, in other words, a theoretical or experimental relationship). In the following description, unless particularly described, it is assumed that the "longitudinal acceleration Gx" and the "lateral acceleration Gy" refer to the absolute value of the longitudinal acceleration Gx and the absolute value of the lateral acceleration Gy. Specifically, in a period in which the prevention yaw moment is applied to the vehicle 1, the longitudinal acceleration Gx is generated in the vehicle 1 due to application of the braking force for applying the prevention yaw moment. The lateral acceleration Gy with a magnitude corresponding to the longitudinal acceleration Gx which is generated due to application of the prevention yaw moment is generated in the vehicle 1 due to application of the prevention yaw moment. Particularly, when no abnormality occurs in the vehicle 1, the lateral acceleration Gy substantially matches an ideal value Gy_ide of the lateral acceleration Gy which is estimated from motion characteristics of the vehicle 1 to be generated in the vehicle 1 due to application of the prevention yaw moment in a state in which a longitudinal acceleration Gx is generated in the vehicle 1 due to application of the prevention yaw moment. That is, substantially, the lateral acceleration Gy which is generated due to the prevention yaw moment applied to the vehicle 1 in which no abnormality occurs is substantially matches the ideal value Gy_ide corresponding to the longitudinal acceleration Gx (in other words, which can be specified from the longitudinal acceleration Gx).

Each of a plurality of plot points P in FIG. 3A indicates a sample of a combination of the longitudinal acceleration Gx and the lateral acceleration Gy which are actually detected when the prevention yaw moment is applied to the vehicle 1 in which no abnormality occurs. As illustrated in FIG. 3A, the lateral acceleration Gy which is actually detected has unevenness but the ideal value Gy_ide can be approximated by a function having the longitudinal acceleration Gx as an argument. Particularly, the ideal value Gy_ide can be approximated by a linear function F having the longitudinal acceleration Gx as an argument as illustrated in FIG. 3A. That is, the ideal value Gy_ide can be approximated by an equation of Gy_ide=F(Gx). Particularly, as can be seen from the graph illustrated in FIG. 3A, since the lateral acceleration Gy is also zero ideally when the longitudinal acceleration Gx is zero, the ideal value Gy_ide can be approximated by an equation of Gy_ide=A×Gx (where A is a predetermined proportional coefficient).

On the other hand, when an abnormality occurs in the vehicle 1, there is a high likelihood that the lateral acceleration Gy will be greater than the ideal value Gy_ide of the lateral acceleration Gy. An example of the internal abnormality which is assumed in the first embodiment is an abnormality related to a component or a process affecting behavior of the vehicle 1 (an abnormality related to a response gain of the vehicle 1). An example of the external abnormality which is assumed in the first embodiment is an abnormality in which the state of the vehicle 1 is separated from an originally assumed state due to an external environment (particularly, an external environment which is not assumed when performing the lane departure preventing operation, such as a sudden strong wind or a gradient of a road surface in the lateral direction) affecting behavior of the vehicle 1.

In this way, the detected lateral acceleration Gy satisfies the relationship of Gy=F(Gx) when the prevention yaw moment is applied to the vehicle 1 in which no abnormality occurs, and the detected lateral acceleration Gy does not satisfy the relationship of Gy=F(Gx) (specifically, a relationship of Gy>F(Gx) is satisfied) when the prevention yaw moment is applied to the vehicle 1 in which an abnormality occurs. The fact that the lateral acceleration Gy satisfies the relationship of Gy>F(Gx) when applying the prevention yaw moment is applied to the vehicle 1 in which an abnormality occurs was confirmed by experiment which was performed by the inventor et al. of the disclosure.

Therefore, in the first embodiment, the LDA limiting unit 173 determines whether a certain abnormality occurs internally or externally in the vehicle 1 based on the comparison result between the lateral acceleration Gy detected in the period in which the prevention yaw moment is applied and the ideal value Gy_ide which is determined depending on the longitudinal acceleration Gx detected in the period in which the prevention yaw moment is applied. That is, the LDA limiting unit 173 determines whether an abnormality occurs in the vehicle 1 by determining whether the lateral acceleration Gy which is actually detected is greater than the ideal value Gy_ide.

Here, as described above, unevenness occurs in the lateral acceleration Gy which is detected in the period in which the prevention yaw moment is applied. Accordingly, even when no abnormality occurs in the vehicle 1, there is a likelihood that it will be determined that the lateral acceleration Gy is greater than the ideal value Gy_ide due to unevenness of the actually detected lateral acceleration Gy. As a result, when the LDA limiting unit 173 determines that an abnormality occurs in the vehicle 1 in a case in which the lateral acceleration Gy is merely greater than the ideal value Gy_ide, the likelihood that it will be erroneously determined that an abnormality occurs in the vehicle 1 which is not originally abnormal relatively becomes higher. Therefore, in the first embodiment, the LDA limiting unit 173 determines whether an abnormality occurs in the vehicle 1 by determining whether the actually detected lateral acceleration Gy is greater than the ideal value Gy_ide by a predetermined value $\alpha$ (that is, whether the actually detected lateral acceleration Gy is greater than a first threshold value Gy_th1 corresponding to the addition result of the ideal value Gy_ide and the predetermined value $\alpha$. That is, the LDA limiting unit 173 determines whether an abnormality occurs in the vehicle 1 by determining whether Gy>Gy_th1 is satisfied. Accordingly, the condition of "Gy>Gy_th1" is an abnormality condition which is used in Step S31 in FIG. 2. When Gy>Gy_th1 is satisfied, the LDA limiting unit 173 determines that an abnormality occurs in the vehicle 1. On the other hand, when Gy>Gy_th1 is not satisfied, the LDA limiting unit 173 determines that no abnormality occurs in the vehicle 1.

It is preferable that an appropriate value capable of distinguishing the vehicle 1 in which no abnormality occurs and the vehicle 1 in which an abnormality occurs be set as the predetermined value $\alpha$ in consideration of the relationship between the longitudinal acceleration Gx and the lateral acceleration Gy which are generated in the vehicle 1 in which an abnormality occurs and the longitudinal acceleration Gx and the lateral acceleration Gy which is generated in the vehicle 1 in which an abnormality occurs. The predetermined value $\alpha$ is a specific example of the above-mentioned "first predetermined value."

Three specific examples of the abnormality conditions having different properties of the predetermined value $\alpha$ will be described below. The following three specific examples of the abnormality conditions are merely examples. Accordingly, an abnormality condition different from the following abnormality conditions may be used.

Figure 3B:
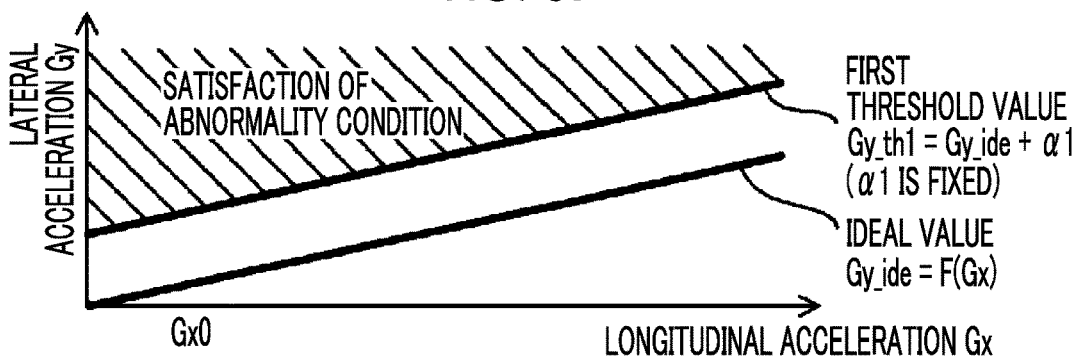
FIG. 3B is a graph illustrating an example of abnormality conditions which are determined based on a longitudinal acceleration and a lateral acceleration.

First, FIG. 3B is a graph illustrating a first specific example of the abnormality conditions. As illustrated in FIG. 3B, in the first specific example, a predetermined value $\alpha$1 (where $\alpha$1>0) which is a fixed value regardless of the longitudinal acceleration Gx is used as the predetermined value $\alpha$. Accordingly, in the first specific example, the first threshold value Gy_th1 is equal to the ideal value Gy_ide+ the predetermined value $\alpha$1.

Figure 3C:
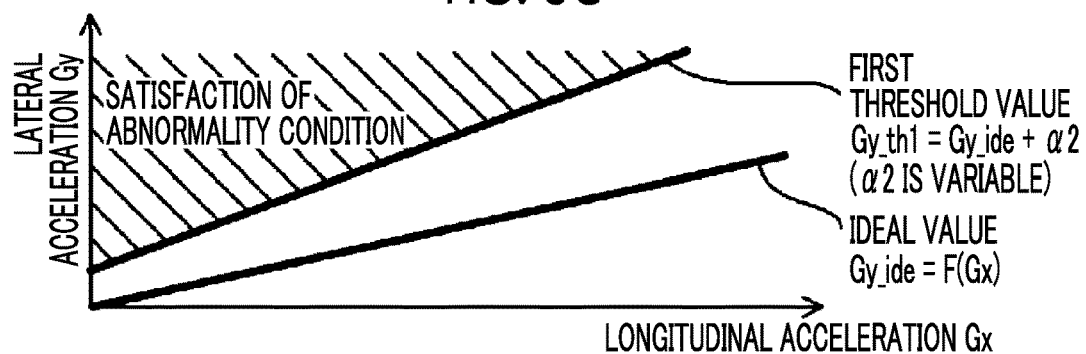
FIG. 3C is a graph illustrating an example of abnormality conditions which are determined based on a longitudinal acceleration and a lateral acceleration.

Subsequently, FIG. 3C is a graph illustrating a second specific example of the abnormality conditions. As illustrated in FIG. 3C, in the second specific example, a predetermined value $\alpha$2 (where $\alpha$2>0) which varies depending on the longitudinal acceleration Gx is used as the predetermined value $\alpha$. Accordingly, in the second specific example, the first threshold value Gy_th1 is equal to the ideal value Gy_ide+the predetermined value $\alpha$2. FIG. 3C illustrates an example of the predetermined value $\alpha$2 which increases monotonously with an increase of the longitudinal acceleration Gx. Here, the predetermined value $\alpha$2 may decrease monotonously with an increase of the longitudinal acceleration Gx. The predetermined value $\alpha$2 may vary in an arbitrary mode depending on the longitudinal acceleration Gx. The predetermined value $\alpha$2 may be specified by a function F' having the longitudinal acceleration Gx as an argument. That is, the predetermined value $\alpha$2 may be specified by a function of $\alpha$2=F'(Gx).

Figure 3D:
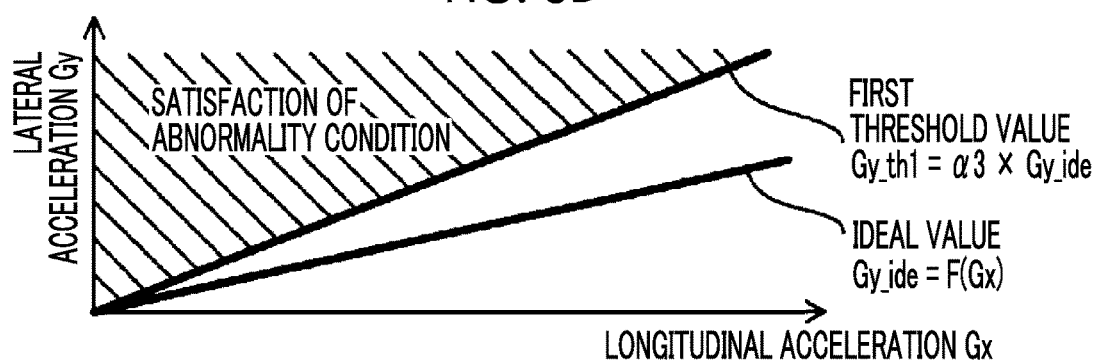
FIG. 3D is a graph illustrating an example of abnormality conditions which are determined based on a longitudinal acceleration and a lateral acceleration.

Subsequently, FIG. 3D is a graph illustrating a third specific example of the abnormality conditions. As illustrated in FIG. 3D, in the third specific example, a predetermined value $\alpha$3 (where $\alpha$3>1) which is a fixed value regardless of the longitudinal acceleration Gx is used as a parameter for determining the predetermined value $\alpha$, other than the predetermined value $\alpha$ as it is. Here, the predetermined value $\alpha$3 is different from the predetermined value $\alpha$1 which is added to the ideal value Gy_ide to determine the first threshold value Gy_th1 in that the predetermined value $\alpha$3 is multiplied by the ideal value Gy_ide to determine the first threshold value Gy_th1. Accordingly, in the third specific example, the first threshold value Gy_th1 is equal to the ideal value Gy_ide×the predetermined value $\alpha$3. In the third specific example, as illustrated in FIG. 3D, the LDA limiting unit 173 also uses the abnormality condition of "Gy>Gy_ide+$\alpha$ (where the predetermined value $\alpha$ is determined by the predetermined value $\alpha$3)." Similarly to the predetermined value $\alpha$2, the predetermined value $\alpha$3 may be a value varying depending on the longitudinal acceleration Gx.

Referring to FIG. 2 again, when it is determined in Step S31 that the abnormality condition is satisfied (YES in Step S31), the LDA limiting unit 173 determines that application of the prevention yaw moment is stopped (Step S32). As a result, the LDA control unit 172 stops application of the braking force capable of applying the prevention yaw moment to the vehicle 1 to the vehicle 1. That is, the LDA control unit 172 controls the brake actuator 13 such that the braking force capable of applying the prevention yaw moment to the vehicle 1 is not applied.

After stopping application of the prevention yaw moment, the ECU 17 ends the lane departure preventing operation illustrated in FIG. 2. When the lane departure preventing operation illustrated in FIG. 2 is ended after application of the prevention yaw moment is stopped, the ECU 17 preferably starts the lane departure preventing operation illustrated in FIG. 2 again after the above-mentioned first predetermined period of time elapses.

On the other hand, when it is determined in Step S31 that the abnormality condition is not satisfied (NO in Step S31), the LDA limiting unit 173 determines that application of the prevention yaw moment is not stopped. As a result, the LDA control unit 172 continues to apply the braking force capable of applying the prevention yaw moment to the vehicle 1 to the vehicle 1. Thereafter, the ECU 17 ends the lane departure preventing operation illustrated in FIG. 2. When the lane departure preventing operation illustrated in FIG. 2 is ended without stopping application of the prevention yaw moment, the ECU 17 starts the lane departure preventing operation illustrated in FIG. 2 again after the above-mentioned first predetermined period of time elapses. That is, the lane departure preventing operation is started again with the prevention yaw moment applied to the vehicle 1. In this case, when it is determined in Step S24 of the lane departure preventing operation which has been started again that the prevention yaw moment is applied to the vehicle 1 but there is still a likelihood that the vehicle 1 will depart from the traveling lane (YES in Step S24), the prevention yaw moment continues to be applied by repeatedly performing the operations of Step S25 and the steps subsequent thereto (a case in which the operation of Step S32 is performed thereafter is excluded). On the other hand, when it is determined in Step S24 of the lane departure preventing operation which has been started again that there is no likelihood that the vehicle 1 will depart from the traveling lane due to application of the prevention yaw moment to the vehicle 1 (NO in Step S24), the lane departure preventing operation illustrated in FIG. 2 is ended after application of the prevention yaw moment is ended.

As described above, the LDA limiting unit 173 can determine whether an abnormality occurs in the vehicle 1 based on the differences between the longitudinal acceleration Gx and the lateral acceleration Gy when an abnormality occurs in the vehicle 1 and the longitudinal acceleration Gx and the lateral acceleration Gy when no abnormality occurs in the vehicle 1. When it is determined that an abnormality occurs in the vehicle 1, the LDA control unit 172 can stop application of the prevention yaw moment. Accordingly, behavior of the vehicle 1 is not destabilized due to continuous application of the prevention yaw moment with an abnormality occurring in the vehicle 1. Application of the prevention yaw moment is stopped, and thus the ECU 17 can specify what abnormality occurs without being affected by application of the prevention yaw moment.

A device according to a first comparative example (so-called electric power steering (EPS)-LDA) that applies a prevention yaw moment by steering the turning wheels is known as the lane departure preventing device. However, the device according to the first comparative example does not apply a braking force and thus the longitudinal acceleration Gx due to the prevention yaw moment is not generated in the vehicle. Accordingly, in the device according to the first comparative example, the longitudinal acceleration Gx and the lateral acceleration Gy in a situation in which no abnormality occurs in the vehicle 1 do not satisfy a relationship that the lateral acceleration Gy matches the ideal value Gy_ide varying linearly with respect to the longitudinal acceleration Gx. That is, in the device according to the first comparative example, it is not possible to determine whether an abnormality occurs in the vehicle by determining whether the lateral acceleration Gy is greater than the ideal value Gy_ide by the predetermined value α. A device according to a second comparative example (specifically, a vehicle stability control device, that is, a so-called vehicle stability control (VCS) device) that prevents a lateral slip of a vehicle is known as a device that controls a vehicle by applying a braking force to vehicle wheels. However, the device according to the second comparative example is a device that applies a braking force in a traveling state in which a slip force of the vehicle wheels exceeds a tire limit (that is, the vehicle wheels start a slip). Accordingly, the longitudinal acceleration Gx and the lateral acceleration Gy in a situation in which no abnormality occurs in the vehicle 1 do not satisfy a relationship that the lateral acceleration Gy matches the ideal value Gy_ide varying linearly with respect to the longitudinal acceleration Gx. That is, the relationship that the lateral acceleration Gy matches the ideal value Gy_ide varying linearly with respect to the longitudinal acceleration Gx is a relationship specific to the vehicle 1 according to the first embodiment that applies the prevention yaw moment by applying a braking force. In view of attention paid to the relationship specific to the vehicle 1 according to the first embodiment that applies the prevention yaw moment by applying the braking force, the vehicle 1 according to the first embodiment is much different from the devices according to the first and second comparative examples and can exhibit the above-mentioned remarkable advantages.

In the above description, when it is determined that the abnormality condition is satisfied, the LDA control unit 172 stops application of the braking force for applying the prevention yaw moment. However, the LDA control unit 172 may set the actually applied braking force to be smaller than the braking force (that is, the target braking force which should be originally applied) capable of applying the prevention yaw moment instead of stopping application of the braking force. That is, the LDA control unit 172 may continue to apply the braking force to the vehicle 1 while setting the braking force which is actually applied to be smaller than the target braking force. In this case, behavior of the vehicle 1 is not destabilized by continuously applying a relatively large braking force to apply the prevention yaw moment with an abnormality occurring in the vehicle 1. The operation of stopping application of the braking force is equivalent to the operation of decreasing the braking force to zero.

(2) Second Embodiment

A second embodiment will be described below. The second embodiment is different from the first embodiment in that a part of a lane departure preventing operation is different. Accordingly, the lane departure preventing operation according to the second embodiment will be described below with reference to FIG. 4. The same processes as the processes of the lane departure preventing operation according to the first embodiment will be referenced by the same step numbers and detailed description thereof will not be repeated.

Figure 4:
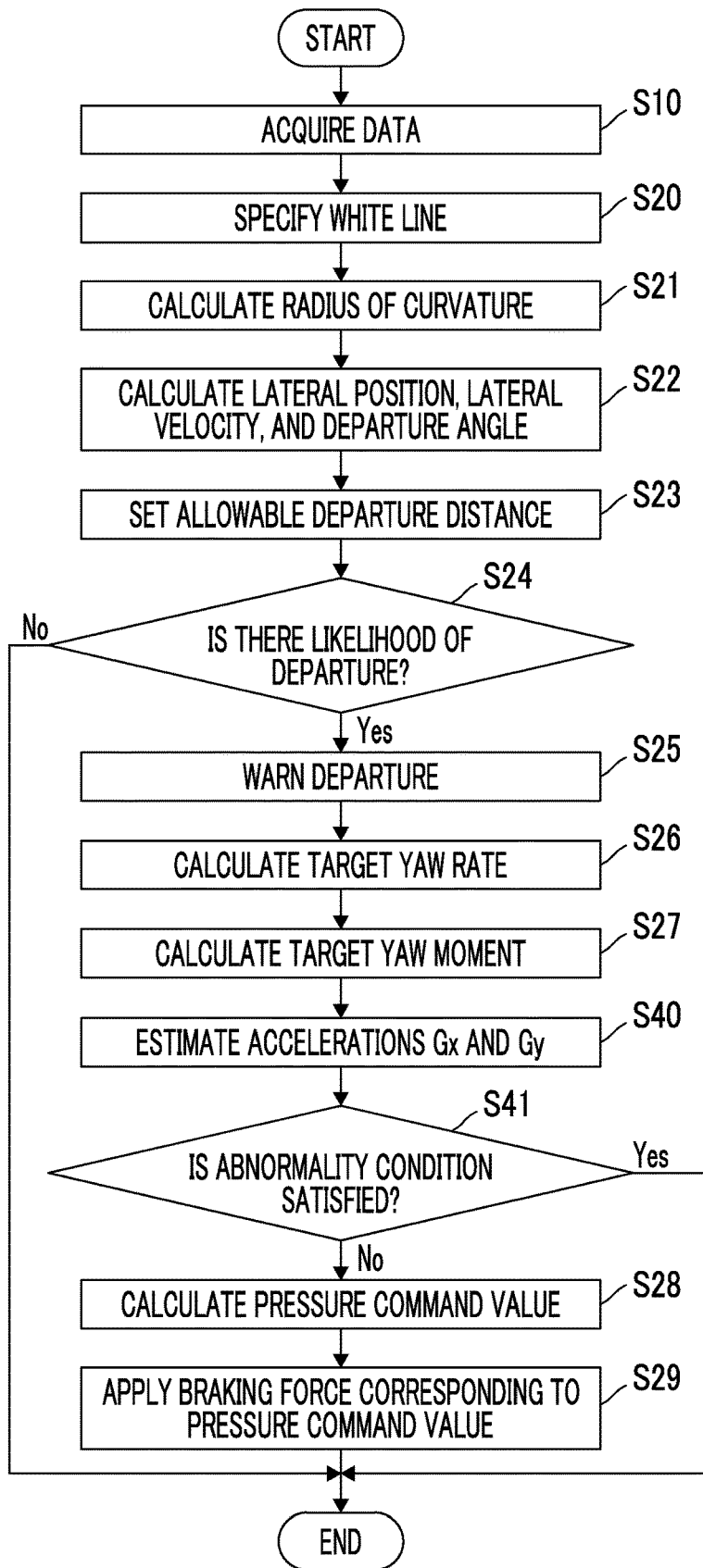
FIG. 4 is a flowchart illustrating a flow of a lane departure preventing operation according to a first embodiment.

As illustrated in FIG. 4, in the second embodiment, the processes of Steps S10 to S27 are also performed.

In the second embodiment, after the target yaw moment $M_{tgt}$ is calculated in Step S27, the LDA limiting unit 173 estimates a longitudinal acceleration Gx and a lateral acceleration Gy which are generated in the vehicle 1 when it is assumed that the target yaw moment $M_{tgt}$ calculated in Step S27 is applied to the vehicle 1 (Step S40). Specifically, the LDA limiting unit 173 specifies the current longitudinal acceleration Gx and the current lateral acceleration Gy of the vehicle 1 (or another arbitrary index capable of specifying the vehicle state) from the detection data acquired in Step S10, and calculates the longitudinal acceleration Gx and the lateral acceleration Gy when the target yaw moment $M_{tgt}$ is applied to the vehicle 1 which travels with the specified longitudinal acceleration Gx and the specified lateral acceleration Gy using a simulation model simulating the vehicle 1 or an arbitrary calculation method derived from the simulation model.

Thereafter, the LDA limiting unit 173 determines whether an abnormality condition is satisfied based on the longitudinal acceleration Gx and the lateral acceleration Gy estimated in Step S40 (Step S41). The abnormality condition used in Step S41 is the same as the abnormality condition used in Step S31 in FIG. 2. The second embodiment is different from the first embodiment in which it is determined whether the abnormality condition is satisfied based on the longitudinal acceleration Gx and the lateral acceleration Gy actually generated in the vehicle 1 after the prevention yaw moment is applied to the vehicle 1, in that before the prevention yaw moment is applied to the vehicle 1, the longitudinal acceleration Gx and the lateral acceleration Gy which will be generated in the vehicle 1 when the prevention yaw moment will be applied to the vehicle 1 are estimated and it is determined whether the abnormality condition is satisfied based on the estimated longitudinal acceleration Gx and the estimated lateral acceleration Gy.

When it is determined in Step S41 that the abnormality condition is satisfied (YES in Step S41), the LDA limiting unit 173 determines that application of the prevention yaw moment is not started. As a result, the LDA control unit 172 does not start application of a braking force capable of applying the prevention yaw moment to the vehicle 1 to the vehicle 1. That is, the LDA control unit 172 controls the brake actuator 13 such that the braking force capable of applying the prevention yaw moment to the vehicle 1 is not applied.

On the other hand, when it is determined in Step S41 that the abnormality condition is not satisfied (NO in Step S41), the LDA limiting unit 173 determines that application of the prevention yaw moment is started. Accordingly, the LDA control unit 172 calculates pressure command values (Step S28) and controls the brake actuator 13 based on the calculated pressure command values. Accordingly, braking forces based on the pressure command values are applied to at least one of the front-left wheel 121FL, the rear-left wheel 121RL, the front-right wheel 121FR, and the rear-right wheel 121RR (Step S29).

As described above, according to the second embodiment, the same advantages as the advantages which can be achieved in the first embodiment can be achieved. In the second embodiment, before the prevention yaw moment is actually applied, it is determined whether the abnormality condition is satisfied when it is assumed that the prevention yaw moment is applied. Accordingly, in the second embodiment, the likelihood that the abnormality condition will be satisfied after the prevention yaw moment is applied is lower than that in the first embodiment. As a result, it is possible to further appropriately prevent destabilization in behavior of the vehicle 1 due to continuous application of the prevention yaw moment with an abnormality occurring in the vehicle 1.

(3) Third Embodiment

A third embodiment will be described below. The third embodiment is different from the second embodiment in that a part of a lane departure preventing operation is different. Accordingly, the lane departure preventing operation according to the third embodiment will be described below with reference to FIG. 5. The same processes as the processes of the lane departure preventing operation according to the second embodiment will be referenced by the same step numbers and detailed description thereof will not be repeated.

Figure 5:
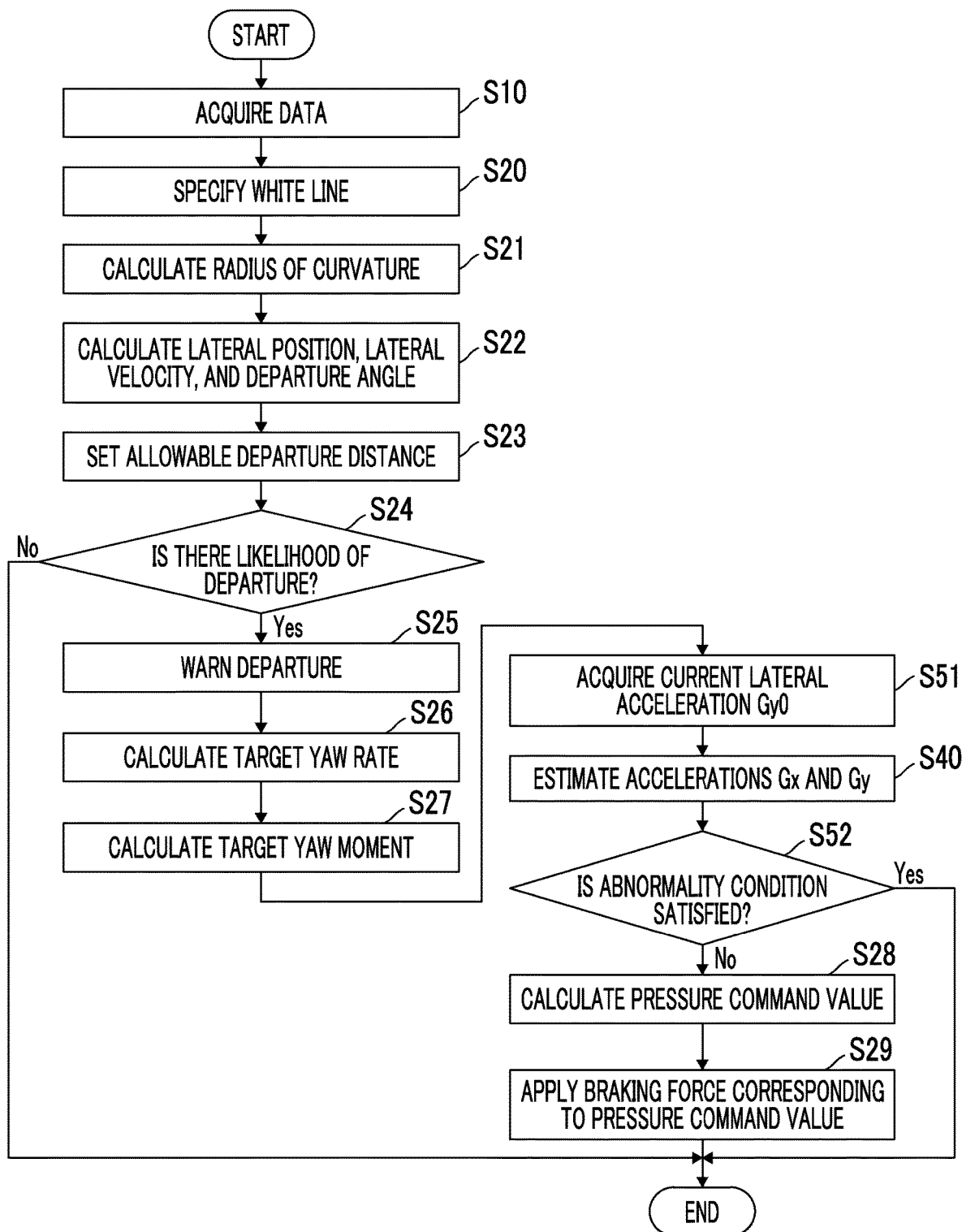
FIG. 5 is a flowchart illustrating a flow of a lane departure preventing operation according to a third embodiment.

As illustrated in FIG. 5, in the third embodiment, the processes of Steps S10 to S27 are also performed, similarly to the second embodiment.

In the third embodiment, after the target yaw moment $M_{tgt}$ is calculated in Step S27, the data acquiring unit 171 acquires a current lateral acceleration Gy (Step S51). Hereinafter, the lateral acceleration Gy acquired in Step S51 is referred to as a "lateral acceleration Gy0." Thereafter, the LDA limiting unit 173 estimates a longitudinal acceleration Gx and a lateral acceleration Gy which are generated in the vehicle 1 when it is assumed that the target yaw moment $M_{tgt}$ calculated in Step S27 is applied to the vehicle 1 (Step S40).

Thereafter, the LDA limiting unit 173 determines whether an abnormality condition is satisfied based on the longitudinal acceleration Gx and the lateral acceleration Gy estimated in Step S41 (Step S52). The abnormality condition used in Step S52 is different from the abnormality condition used in the second embodiment in that a second threshold value Gy_th2 is used instead of the first threshold value Gy_th1. The second threshold value Gy_th2 is determined depending on the lateral acceleration Gy0 acquired in Step S51. The abnormality condition in the third embodiment will be described below with reference to FIG. 6.

Figure 6:
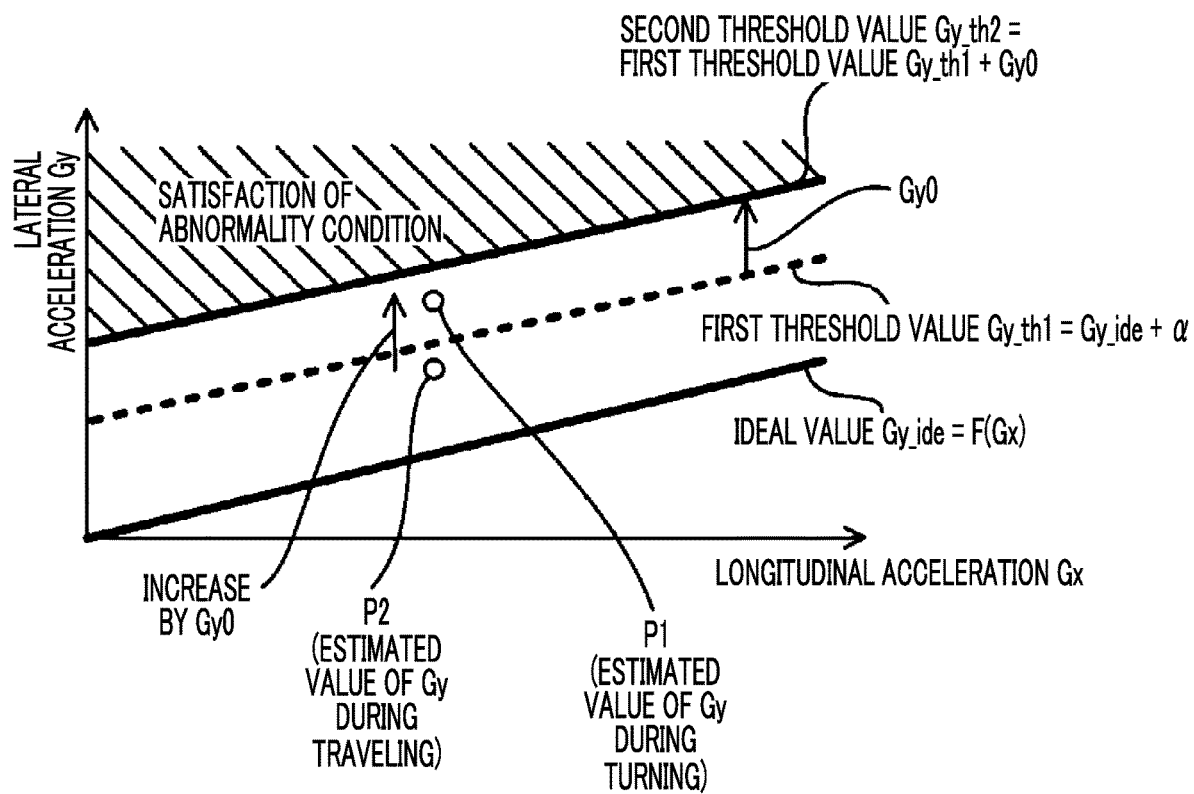
FIG. 6 is a graph illustrating abnormality conditions which are used in the third embodiment.

As illustrated in FIG. 6, the second threshold value Gy_th2 for specifying the abnormality condition in the third embodiment is acquired by adding the lateral acceleration Gy0 acquired in Step S51 in FIG. 5 to the first threshold value Gy_th1 for specifying the abnormality condition in the second embodiment. That is, the second threshold value Gy_th2 can be specified by an expression of second threshold value Gy_th2=first threshold value Gy_th1+lateral acceleration Gy0=ideal value Gy_ide+predetermined value α+lateral acceleration Gy0. The "predetermined value α+lateral acceleration Gy0" is a specific example of the above-mentioned "second predetermined value." The reason for using the second threshold value Gy_th2 is as follows.

First, when the lateral acceleration Gy0 is not zero, it is estimated that the lateral acceleration Gy is already generated in the vehicle 1 in a stage in which the prevention yaw moment is not applied to the vehicle 1 yet. In the following description, a situation in which the vehicle 1 is turning is assumed as the situation in which the lateral acceleration Gy is already generated in the vehicle 1 in the stage in which the prevention yaw moment is not applied to the vehicle 1 yet. Examples of the situation in which the lateral acceleration Gy is already generated in the vehicle 1 in the stage in which the prevention yaw moment is not applied to the vehicle 1 yet include a situation in which a lateral wind blows in the vehicle 1 and a situation in which the vehicle 1 travels on a road surface inclined in the lateral direction. In this case, the lateral acceleration Gy estimated in Step S40 in FIG. 5 includes a component of the lateral acceleration Gy (that is, the lateral acceleration Gy due to turning of the vehicle 1) which is already generated before the prevention yaw moment is applied as well as a component of the lateral acceleration Gy which is generated due to application of the prevention yaw moment. This is because, as described above, the LDA limiting unit 173 specifies the current longitudinal acceleration Gx and the current lateral acceleration Gy (that is, the lateral acceleration Gy substantially equivalent to the lateral acceleration Gy0) of the vehicle 1 and calculates the longitudinal acceleration Gx and the lateral acceleration Gy when the prevention yaw moment is applied to the vehicle 1 traveling with the specified longitudinal acceleration Gx and the specified lateral acceleration Gy based on the prevention yaw moment.

Although the same prevention yaw moment is applied, the lateral acceleration Gy (see point P1 in FIG. 6) estimated when the vehicle 1 is turning is greater than the lateral acceleration Gy (see point P2 in FIG. 6) estimated when the vehicle 1 travels straightly by the lateral acceleration Gy0. Accordingly, even when no abnormality occurs in the vehicle 1, there is a likelihood that it will be erroneously determined that the lateral acceleration Gy which is greater than the lateral acceleration Gy originally generated due to application of the prevention yaw moment by the lateral acceleration Gy0 is greater than the first threshold value Gy_th1. That is, even when no abnormality occurs in the vehicle 1, there is a likelihood that it will be erroneously determined that the abnormality condition is satisfied due to turning of the vehicle 1.

Therefore, in the third embodiment, in consideration of a point that the lateral acceleration Gy0 already generated before the prevention yaw moment is applied can be included in the lateral acceleration Gy estimated by the LDA limiting unit 173, the second threshold value Gy_th2 is greater than the first threshold value Gy_th1 by the lateral acceleration Gy0. Accordingly, even when the lateral acceleration Gy0 already generated before the prevention yaw moment is applied is included in the lateral acceleration Gy estimated by the LDA limiting unit 173, the above-mentioned erroneous determination is not caused.

When the lateral acceleration Gy0 is zero, the second threshold value Gy_th2 is equal to the first threshold value Gy_th1. Accordingly, when the lateral acceleration Gy0 is zero, the same processes as in the second embodiment are performed in the third embodiment. That is, in the third embodiment, substantially, it is determined whether the estimated lateral acceleration Gy is greater than the second threshold value Gy_th2 when application of the prevention yaw moment is started in the state in which the lateral acceleration Gy0 is generated in the vehicle 1, and it is determined whether the estimated lateral acceleration Gy is greater than the first threshold value Gy_th1 when application of the prevention yaw moment is started in the state in which the lateral acceleration Gy0 is not generated in the vehicle 1 (that is, the lateral acceleration Gy0 is zero).

Referring to FIG. 5 again, when it is determined in Step S52 that the abnormality condition is satisfied (YES in Step S52), the LDA limiting unit 173 determines that application of the prevention yaw moment is not started. As a result, the LDA control unit 172 controls the brake actuator 13 such that the braking force capable of applying the prevention yaw moment to the vehicle 1 is not applied. On the other hand, when it is determined in Step S52 that the abnormality condition is not satisfied (NO in Step S52), the LDA limiting unit 173 determines that application of the prevention yaw moment is started. Accordingly, the LDA control unit 172 calculates the pressure command values (Step S28) and controls the brake actuator 13 based on the calculated pressure command values. Accordingly, the braking forces corresponding to the pressure command values are applied to at least one of the front-left wheel 121FL, the rear-left wheel 121RL, the front-right wheel 121FR, and the rear-right wheel 121RR (Step S29).

As described above, according to the third embodiment, the same advantages as the advantages which can be achieved in the second embodiment can be achieved. In the third embodiment, even when the lateral acceleration Gy0 is already generated in the vehicle 1 before the prevention yaw moment is applied, it is possible to appropriately determine whether an abnormality occurs in the vehicle 1.

In the first embodiment, there is a likelihood that the lateral acceleration Gy0 (for example, the lateral acceleration due to turning which is generated in a situation in which the vehicle 1 to which the prevention yaw moment is applied turns) already generated before the prevention yaw moment is applied will be included in the lateral acceleration Gy (Step S30 in FIG. 2) acquired by the data acquiring unit 171 to determine whether the abnormality condition is satisfied. Accordingly, in the first embodiment, the abnormality condition which is specified by the second threshold value Gy_th2 instead of the first threshold value Gy_th1 may be used. In this case, similarly to the third embodiment, it is preferable that the lateral acceleration Gy0 be acquired before the prevention yaw moment is applied in the first embodiment.

In the second and third embodiments, similarly to the first embodiment, when it is determined that the abnormality condition is satisfied, the LDA control unit 172 may start application of a braking force smaller than the braking force (that is, a target braking force which should be originally applied) capable of applying the prevention yaw moment may be started instead of applying the braking force for applying the prevention yaw moment.

At least a part of the elements of the first to third embodiments may be appropriately combined with another part of the elements of the first to third embodiments. At least a part of the elements of the first to third embodiments may not be used.

The disclosure can be appropriately modified without departing from the gist or spirit of the disclosure which can be read from the claims and the whole specification, and a lane departure preventing device including such modifications is included in the technical spirit of the disclosure.

What is claimed is:

1. A lane departure preventing device comprising
at least one electronic control unit configured to:
when there is a likelihood that a vehicle will depart from a traveling lane in which the vehicle travels, calculate a prevention yaw moment, the prevention yaw moment for preventing departure of the vehicle from the traveling lane, and control a brake actuator configured to apply a braking force to a vehicle wheel such that the prevention yaw moment is applied to the vehicle;
acquire a first lateral acceleration and a longitudinal acceleration, the first lateral acceleration and the longitudinal acceleration being generated in the vehicle when the prevention yaw moment is applied;
determine whether the first lateral acceleration is greater than an ideal value of the first lateral acceleration by a first predetermined value, the ideal value of the first lateral acceleration being estimated, from motion characteristics of the vehicle, to be generated in the vehicle due to application of the prevention yaw moment when the longitudinal acceleration is generated in the vehicle due to application of the prevention yaw moment;
control the brake actuator such that the braking force matches a target braking force, the target braking force being required to apply the prevention yaw moment to the vehicle, when it is determined that the first lateral acceleration is not greater than the ideal value by the first predetermined value; and
control the brake actuator such that the braking force is less than the target braking force, when it is determined that the first lateral acceleration is greater than the ideal value by the first predetermined value.

2. The lane departure preventing device according to claim 1, wherein the at least one electronic control unit is configured to cancel application of the braking force by the brake actuator when it is determined that the first lateral acceleration is greater than the ideal value by the first predetermined value.

3. The lane departure preventing device according to claim 1, wherein the at least one electronic control unit is configured to:
   determine whether a total value of the first lateral acceleration and a second lateral acceleration is greater than the ideal value by a second predetermined value, the second predetermined value being greater than the first predetermined value, when application of the prevention yaw moment is started in a state in which the second lateral acceleration is generated in the vehicle;
   determine whether the first lateral acceleration is greater than the ideal value by the first predetermined value when application of the prevention yaw moment is started in a state in which the second lateral acceleration is not generated in the vehicle;
   control the brake actuator such that the braking force matches the target braking force when it is determined that the total value of the first lateral acceleration and the second lateral acceleration is not greater than the ideal value by the second predetermined value; and
   control the brake actuator such that the braking force is less than the target braking force when it is determined that the total value of the first lateral acceleration and the second lateral acceleration is greater than the ideal value by the second predetermined value.

4. The lane departure preventing device according to claim 3, wherein the second predetermined value is greater than the first predetermined value by the second lateral acceleration, and the second lateral acceleration is generated in the vehicle before application of the prevention yaw moment is started.

5. The lane departure preventing device according to claim 3, wherein the at least one electronic control unit is configured to cancel application of the braking force by the brake actuator when it is determined that the total value of the first lateral acceleration and the second lateral acceleration is greater than the ideal value by the second predetermined value.

6. The lane departure preventing device according to claim 1, wherein the first predetermined value is calculated based on the longitudinal acceleration.

7. The lane departure preventing device according to claim 1, wherein the at least one electronic control unit is configured to determine whether the first lateral acceleration is greater than a first threshold value that is greater than the ideal value by the first predetermined value.

8. The lane departure preventing device according to claim 1, wherein the first predetermined value is a fixed value.

9. The lane departure preventing device according to claim 1, wherein the first predetermined value varies based on the longitudinal acceleration.

10. A lane departure preventing device comprising at least one electronic control unit configured to:
    when there is a likelihood that a vehicle will depart from a traveling lane in which the vehicle travels, calculate a prevention yaw moment, the prevention yaw moment for preventing departure of the vehicle from the traveling lane, and control a brake actuator configured to apply a braking force to a vehicle wheel such that the prevention yaw moment is applied to the vehicle;
    acquire a first lateral acceleration and a longitudinal acceleration, the first lateral acceleration and the longitudinal acceleration being generated in the vehicle when the prevention yaw moment is applied;
    determine whether the first lateral acceleration is greater than a first threshold value that is greater than an ideal value of the first lateral acceleration by a first predetermined value, the ideal value of the first lateral acceleration being estimated, from motion characteristics of the vehicle, to be generated in the vehicle due to application of the prevention yaw moment when the longitudinal acceleration is generated in the vehicle due to application of the prevention yaw moment;
    control the brake actuator such that the braking force matches a target braking force, the target braking force being required to apply the prevention yaw moment to the vehicle, when it is determined that the first lateral acceleration is less than the first threshold value; and
    control the brake actuator such that the braking force is less than the target braking force, when it is determined that the first lateral acceleration is greater than the first threshold value.

11. A lane departure preventing device comprising at least one electronic control unit configured to:
    when there is a likelihood that a vehicle will depart from a traveling lane in which the vehicle travels, calculate a prevention yaw moment, the prevention yaw moment for preventing departure of the vehicle from the traveling lane, and control a brake actuator configured to apply a braking force to a vehicle wheel such that the prevention yaw moment is applied to the vehicle;
    acquire a first lateral acceleration and a longitudinal acceleration, the first lateral acceleration and the longitudinal acceleration being generated in the vehicle when the prevention yaw moment is applied;
    determine whether the first lateral acceleration is greater than a first threshold value that corresponds to a sum of an ideal value of the first lateral acceleration and a first predetermined value, the ideal value of the first lateral acceleration being estimated, from motion characteristics of the vehicle, to be generated in the vehicle due to application of the prevention yaw moment when the longitudinal acceleration is generated in the vehicle due to application of the prevention yaw moment;
    control the brake actuator such that the braking force matches a target braking force, the target braking force being required to apply the prevention yaw moment to the vehicle, when it is determined that the first lateral acceleration is less than the first threshold value; and
    control the brake actuator such that the braking force is less than the target braking force, when it is determined that the first lateral acceleration is greater than the first threshold value,
    wherein the first threshold value is different than the ideal value.

* * * * *